United States Patent
Haasl

(10) Patent No.: US 7,611,549 B2
(45) Date of Patent: Nov. 3, 2009

(54) MAGNETIC STACKING FIXTURE FOR STACKING ELECTRODES

(75) Inventor: Benjamin J. Haasl, Forest Lake, MN (US)

(73) Assignee: Cardiac Pacemakers, Inc., St. Paul, MN (US)

( * ) Notice: Subject to any disclaimer, the term of this patent is extended or adjusted under 35 U.S.C. 154(b) by 966 days.

(21) Appl. No.: 10/744,942

(22) Filed: Dec. 22, 2003

(65) Prior Publication Data

US 2005/0132561 A1 Jun. 23, 2005

(51) Int. Cl.
*H01M 10/04* (2006.01)
*H01M 4/64* (2006.01)
*H01M 4/66* (2006.01)

(52) U.S. Cl. ............... 29/623.5; 429/10; 429/162; 29/623.1

(58) Field of Classification Search ............. None
See application file for complete search history.

(56) References Cited

U.S. PATENT DOCUMENTS

| | | | |
|---|---|---|---|
| 2,993,395 A | 7/1961 | Bohn | |
| 3,452,310 A | 6/1969 | Israelson | |
| 3,775,717 A | 11/1973 | Braillon | |
| 4,034,846 A * | 7/1977 | Burgis et al. | 414/788.9 |
| 4,121,723 A * | 10/1978 | Nellen et al. | 414/790 |
| 4,379,277 A | 4/1983 | Braillon | |
| 4,465,415 A | 8/1984 | Eberling et al. | |
| 4,471,331 A | 9/1984 | Wyatt | |
| 4,553,304 A | 11/1985 | Fleuret | |
| 4,652,845 A | 3/1987 | Finkle | |
| 5,187,030 A * | 2/1993 | Firmin et al. | 429/120 |
| 5,460,480 A * | 10/1995 | Jubre et al. | 414/793.2 |
| 5,525,950 A | 6/1996 | Wang | |
| 5,569,553 A * | 10/1996 | Smesko et al. | 429/90 |
| 5,800,724 A | 9/1998 | Habeger et al. | |
| 5,981,106 A * | 11/1999 | Amine et al. | 429/224 |
| 6,228,533 B1 * | 5/2001 | Ohashi et al. | 429/217 |
| 6,632,720 B2 * | 10/2003 | Barr et al. | 438/396 |
| 2004/0127952 A1 | 7/2004 | O'Phelan et al. | |
| 2005/0132561 A1 * | 6/2005 | Haasl | 29/623.5 |

* cited by examiner

*Primary Examiner*—Patrick Ryan
*Assistant Examiner*—Alix Echelmeyer
(74) *Attorney, Agent, or Firm*—Schwegman, Lundberg & Woessner, P.A.

(57) ABSTRACT

One aspect relates to a system for stacking electrodes. In various embodiments, the system comprises a working surface, a device to stack foil electrodes on the working surface during an assembly process to form an electrode stack, and a magnetic source to apply a magnetic field proximate to the working surface. The magnetic field influences at least some of the electrodes and holds the electrode stack to the working surface during the assembly process. A second aspect relates to a process for stacking electrodes. In various embodiments, the process comprises forming an electrode stack proximate to a working surface during an assembly process. The electrode stack includes two or more foil electrodes, at least one of which is magnetic. The process provides a magnetic field to influence the at least one magnetic electrode and holds the one or more electrodes to the working surface. Other aspects are provided herein.

65 Claims, 8 Drawing Sheets

MAGNETIC STACKING FIXTURE FOR STACKING ELECTRODES

TECHNICAL FIELD

This application relates generally to the stacking of electrodes and, more particularly, to methods and systems for stacking electrodes, such as battery electrodes and capacitor electrodes, for implantable medical devices, using a magnetic stacking fixture.

BACKGROUND OF THE INVENTION

Some implantable medical devices include, among other things, capacitors and batteries. It is desired to design small implantable medical devices, and thus it is desired to design small batteries and capacitors for these devices. These small batteries and capacitors include thin electrode foils. These electrode foils can have different sizes and shapes to prevent electrical shorts, accommodate space constraints, or for other reasons. The differently sized and shaped electrodes present difficulties in assembly operations, including difficulties registering the electrodes to a location for stacking, and difficulties stacking the different sized electrodes onto one another.

Mechanical hold-downs such as webbing or clamps have been used to hold-down electrodes to prevent movement while they are being stacked. Drawbacks of mechanical hold-downs include the speed with which a mechanical hold-down enters the assembly area, holds the stack, and retracts from the assembly area. Further, they have difficulty in handling varied electrode shapes. Additionally, some mechanical hold-downs damage the electrodes, which can adversely affect the electrical characteristics of the battery or capacitor.

SUMMARY OF THE INVENTION

The above-mentioned problems are addressed by the present subject matter and will be understood by reading and studying the following specification.

One aspect of the present subject matter relates to a system for stacking electrodes. In various embodiments, the system comprises a working surface, a device to stack foil electrodes on the working surface during an assembly process to form an electrode stack, and a magnetic source to apply a magnetic field proximate to the working surface. The magnetic field influences at least some of the electrodes and holds the electrode stack to the working surface during the assembly process.

One aspect relates to a system for stacking electrodes. In various embodiments, the system comprises a means to form an electrode stack proximate to a working surface during an assembly process. The electrode stack includes two or more foil electrodes, at least one of which is magnetic. The system includes a means to provide a magnetic field to influence the at least one magnetic electrode and hold the one or more electrodes to the working surface.

One aspect relates to a process for stacking electrodes into an assembly which comprises forming an electrode stack proximate to a working surface during assembly. The electrode stack includes two or more foil electrodes, at least one of which is magnetic. The process provides a magnetic field to influence the at least one magnetic electrode and hold the one or more electrodes to the working surface. Other aspects are provided herein.

This Summary is an overview of some of the teachings of the present application and is not intended to be an exclusive or exhaustive treatment of the present subject matter. Further details about the present subject matter are found in the detailed description and appended claims. Other aspects will be apparent to persons skilled in the art upon reading and understanding the following detailed description and viewing the drawings that form a part thereof, each of which are not to be taken in a limiting sense. The scope of the present invention is defined by the appended claims and their equivalents.

DETAILED DESCRIPTION

The following detailed description of the present subject matter refers to the accompanying drawings which show, by way of illustration, specific aspects and embodiments in which the present subject matter may be practiced. These embodiments are described in sufficient detail to enable those skilled in the art to practice the present subject matter. Other embodiments may be utilized and structural, logical, and electrical changes may be made without departing from the scope of the present subject matter. References to "an", "one", or "various" embodiments in this disclosure are not necessarily to the same embodiment, and such references contemplate more than one embodiment. The following detailed description is, therefore, not to be taken in a limiting sense, and the scope is defined only by the appended claims, along with the full scope of legal equivalents to which such claims are entitled.

Various aspects and embodiments of the present subject matter stack foil electrodes for use in implantable medical devices. The present subject matter uses magnetic field (H) to hold foil electrodes during placement and assembly of electrode stacks. The present subject matter decreases the time required to hold-down electrode stacks compared to the time required by physical hold-downs. Removal of physical hold-downs also eliminates the damage that can result from physical hold-downs contacting the foil electrodes. Additionally, in various embodiments, the cost of assembly is reduced by eliminating physical hold-downs. A further benefit is that the present subject matter is capable of stacking electrodes with varying profiles and thicknesses while reducing or eliminating the need to configure a physical hold-down to adapt to the variation.

Figure 1A:
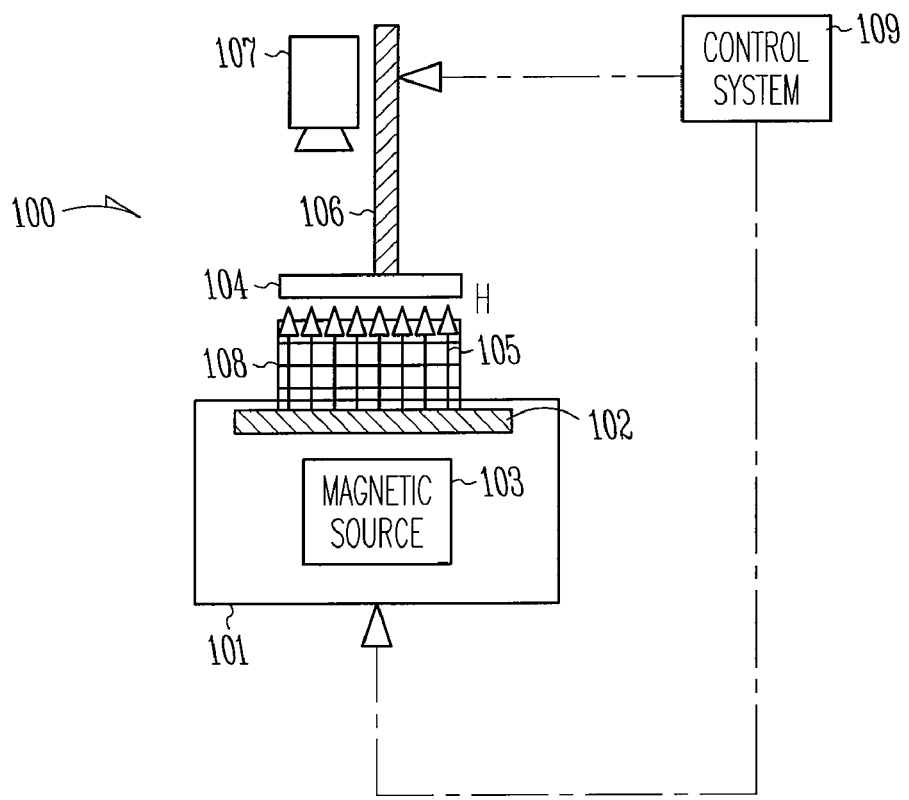
FIGS. 1A-1B illustrate a system for stacking electrodes, according to various embodiments of the present subject matter.
Figure 1B:
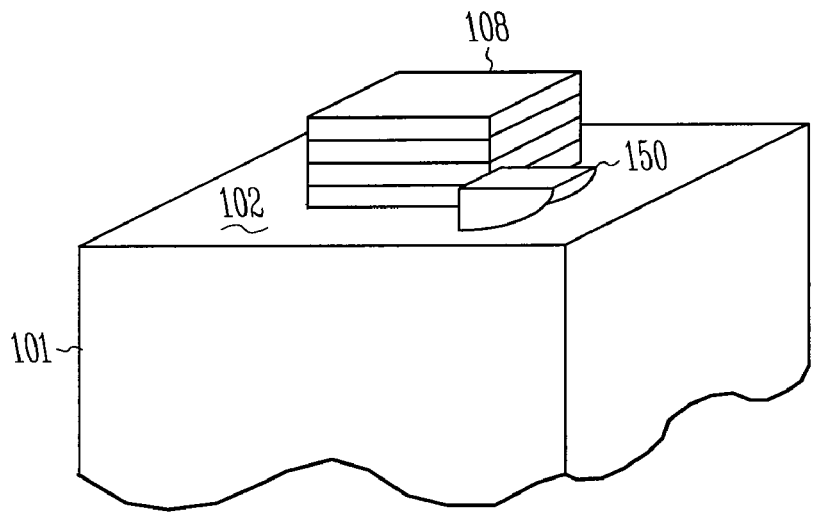

FIGS. 1A-1B illustrate a system for stacking electrodes 100, according to various embodiments of the present subject matter. The illustrated system 100 includes an assembly area 101, which includes a working surface 102 and a magnetic source 103. The magnetic source 103 applies a magnetic field (H) 105 to hold-down foil electrodes 104 to the working surface 102. In various embodiments, the magnetic source 103 is integrated with the working surface 102. In various embodiments, the magnetic source 103 is separate from the working surface 102 and is located proximate to the working surface 102 within the assembly area 101.

The magnetic source 103 generates a magnetic field (H) 105, which influences the electrode stack 108, pulling the electrode stack 108 to the working surface 102, and holding it proximate to the working surface 102.

The foil electrodes 104 are placed onto the working surface 102 in various embodiments by a pick and place machine 106. In various embodiments, the illustrated pick and place machine 106 obtains foil electrodes 104 and places them onto the electrode stack 108 in a desired location using visual registration. In some embodiments, visual registration is accomplished by using a camera 107, and in further embodiments is accomplished by other methods known to those skilled in the art. In various embodiments, the foil electrodes 104 are registered by other means, including limit switches, open-loop computer controlled coordinates, closed-loop physical registration, or combinations thereof. In some embodiments, the foil electrodes 104 are placed on the working surface 102 by assembly personnel.

In various embodiments, the foil electrodes 104 are placed onto the working surface 102, and are not influenced by the magnetic field (H) 105 until they are completely placed. After the foil electrodes 104 are placed, they are held in place by a magnetic field (H) 105 generated by the magnetic source 103. Such embodiments are useful to prevent foil electrodes from being deformed due to the influence of the magnetic field (H) 105 as the foil electrodes are being placed. In other embodiments, the magnetic field (H) 105 influences the foil electrodes as they are being placed.

In various embodiments a control system 109 controls the placement of foil electrodes onto the electrode stack. In some embodiments, a control system 109 modulates how the magnetic field (H) 105 is applied to the electrode stack 108. The control system 109 can include hardware, software or a combination of hardware and software. For example, some embodiments use a processor and a memory. Computer readable instructions are embedded in the memory, and the processor operates on these instructions to perform the control processes.

In various embodiments, all of the foil electrodes are magnetic, and the control system 109 applies a magnetic field (H) 105 to the electrode stack 108 as desired to securely hold the foil electrodes 104 in the electrode stack 108. In other embodiments, the foil electrodes 104 are a mix of magnetic and nonmagnetic layers. One example of a magnetic material is a ferrous metal. The magnetic field (H) 105 influences the magnetic layers, which sandwich the nonmagnetic layers, holding the entire electrode stack 108 proximate to the working surface 102. In some embodiments, magnetic foil electrodes are formed by doping or mixing a nonmagnetic material with a magnetic material, such as iron.

Some embodiments use a secondary hold-down. For example, a secondary hold-down might comprise a flexible arm or a web. One benefit of having a secondary hold-down is that it keeps the nonmagnetic foil electrodes registered during the stacking process. When a nonmagnetic foil electrode is placed on the stack, it will not be influenced by the magnetic field (H) 105. A secondary hold-down can hold the nonmagnetic layer until a magnetic layer is stacked upon it, allowing the magnetic layer to sandwich the nonmagnetic layer proximate to the working surface.

In various embodiments, magnetic shielding limits the influence of the magnetic field on the electrode stack by masking or shielding the electrode stack from the magnetic potential. Such shielding assists with registering foil electrodes on the surface. In various embodiments, the working surface is constructed so as to provide this shielding. Some embodiments use a secondary mask placed between the electrode stack and the magnetic source. Other embodiments do not use magnetic shielding.

FIG. 1B illustrates, in various embodiments, working surface 102 with a relief 150 which maintains a space between an electrode stack 108 and the working surface 102. The relief 150 permits a finger mechanism, known to those skilled in the art, to enter the assembly area 101, hold the electrode stack 108, and remove the assembled electrode stack 108. In some embodiments, the assembled electrode stack is removed from the working surface 102 while the magnetic field (H) 105 is influencing it. In other embodiments, the assembled electrode stack is not influenced by magnetic field (H) 105 while being removed from the working surface 102. The influence of the magnetic field (H) 105 is controlled using methods herein described. Among the benefits of using such a mechanism and a relief to remove the assembled electrode stack are quick removal of the assembled electrode stack.

Figure 2:
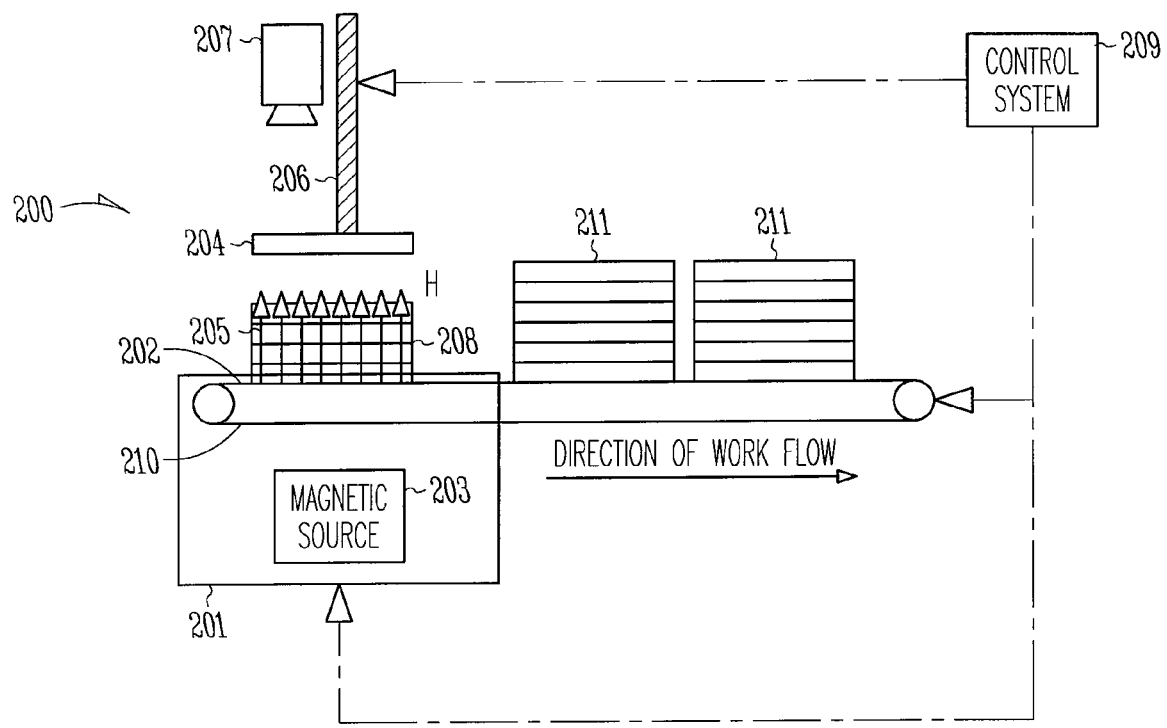
FIG. 2 illustrates a system for stacking electrodes onto a conveyor, according to various embodiments of the present subject matter.

FIG. 2 illustrates a system for stacking electrodes 204 onto a conveyor 210, according to various embodiments of the present subject matter. The illustrated system 200 includes an assembly area 201, which includes a working surface 202 and a magnetic source 203. The magnetic source 203 applies a magnetic field (H) 205 to hold-down foil electrodes 204 to the working surface 202. In various embodiments, the magnetic source 203 is separate from the working surface 202 and is located proximate to the working surface 202 within the assembly area 201. The magnetic source 203 generates a magnetic field (H) 205, which influences the electrode stack 208, pulling the electrode stack 208 to the working surface 202, and holding it proximate to the working surface 202.

The foil electrodes 204 are placed onto the working surface 202 in various embodiments by a pick and place machine 206. In various embodiments, the illustrated pick and place machine 206 obtains foil electrodes 204 and places them onto the electrode stack 208 in a desired location using visual registration. In some embodiments, visual registration is accomplished by using a camera 207, and in further embodiments is accomplished by other methods known to those skilled in the art. In various embodiments, the foil electrodes 204 are registered by other means, including limit switches, open-loop computer controlled coordinates, or combinations thereof. In some embodiments, the foil electrodes 204 are placed on the working surface 202 by assembly personnel.

In various embodiments, the foil electrodes 204 are placed onto the working surface 202, and are not influenced by the magnetic field (H) 205 until they are completely placed. After the foil electrodes 204 are placed, they are held proximate to the working surface 202 by a magnetic field (H) 205 generated by the magnetic source 203. Such embodiments are useful to prevent foil electrodes from being deformed due to the influence of the magnetic field (H) 205 as the foil electrodes are being placed. In other embodiments, the magnetic field (H) 205 influences the foil electrodes as they are being placed.

In various embodiments, the working surface 202 is a conveyor 210, which allows the electrode stacks 211 to move in relation to the magnetic source 203. The conveyor 210 functions to transport the electrode stacks 211 about the assembly area 201. In various embodiments, the conveyor is controlled by the control system 209. If the magnetic source 203 is influencing the electrode stack 208, the conveyor is capable of controlling the magnetic influence by moving the electrode stack 208 toward it or away from it.

In various embodiments a control system 209 controls the placement of foil electrodes onto the electrode stack. In some embodiments, a control system 209 modulates how the magnetic field (H) 205 is applied to the electrode stack 208. The control system 209 can include hardware, software or a combination of hardware and software. For example, some embodiments use a processor and a memory. Computer readable instructions are embedded in the memory, and the processor operates on these instructions to perform the control processes.

In various embodiments, all of the foil electrodes are magnetic, and the control system 209 applies a magnetic field (H) 205 to the electrode stack 208 as desired to securely hold the foil electrodes 204 in the electrode stack 208. In other embodiments, the foil electrodes 204 are a mix of magnetic and nonmagnetic layers. The magnetic field (H) 205 influences the magnetic layers, which sandwich the nonmagnetic layers, holding the entire electrode stack 208 proximate to the working surface 202.

Some embodiments use a secondary hold-down. For example, a secondary hold-down might comprise a flexible arm or a web. One benefit of having a secondary hold-down is that keeps the nonmagnetic foil electrodes registered during the stacking process. When a nonmagnetic foil electrode is placed on the stack, it will not be influenced by the magnetic field (H) 205. A secondary hold-down can hold the nonmagnetic layer until a magnetic layer is stacked upon it, allowing the magnetic layer to sandwich the nonmagnetic layer proximate to the working surface.

In various embodiments, magnetic shielding limits the influence of the magnetic field on the electrode stack by masking or shielding the electrode stack from the magnetic potential. Such shielding assists with registering foil electrodes on the surface. Some embodiments use a secondary mask placed between the electrode stack and the magnetic source. Other embodiments do not use magnetic shielding.

Figure 3A:
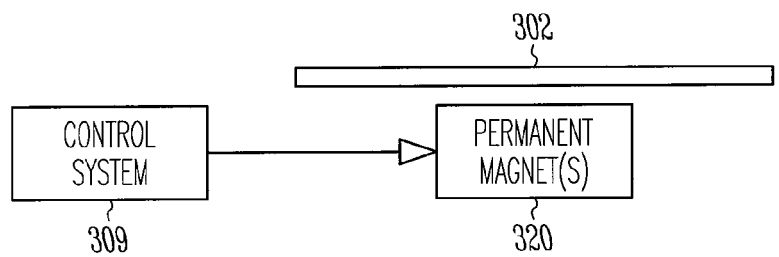
FIGS. 3A-3B illustrate systems for stacking electrodes using permanent magnets and electro magnets, respectively, according to various embodiments of the present subject matter.
Figure 3B:
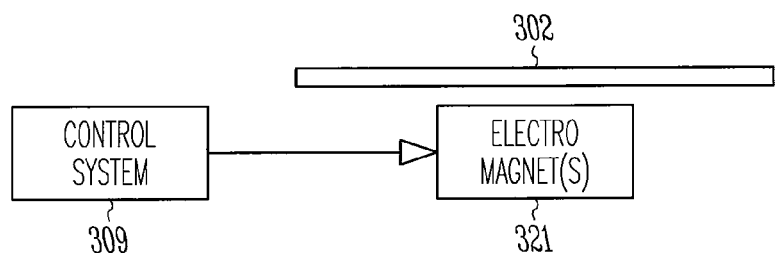

FIGS. 3A-3B illustrate systems for stacking foil electrodes using permanent magnets 320 and electro magnets 321, respectively, according to various embodiments of the present subject matter. FIG. 3A illustrates a magnetic source that includes a permanent magnet 320. In various embodiments, the magnet is fixed in orientation. As such, the magnet continuously exerts a magnetic influence on any foil electrodes which are within the magnetic field (H).

In various embodiments, the working surface 302 is removed from the influence of the magnet by separating the working surface using, for example, a dynamic mechanical linkage. Similarly, in various embodiments, the magnetic source is removed from the assembly area by a dynamic mechanical linkage.

The magnet is not fixed in orientation in some embodiments, but is part of a dynamic mechanism which allows the magnet or magnets to be rotated such that their influence on the electrode stack is added or removed in accordance with direction from a control system 309. The control system is connected to a dynamic linkage which is connected to a plurality of pivoting magnets. The magnets remain in the assembly area, and are rotated approximately 90 degrees, about an axis which runs approximately parallel to the working surface, in order to shift their magnetic influence away from the working surface.

In various embodiments, the control system 309 is part of the control system which controls other aspects of the present subject matter. In other embodiments, the control system 309 exists separate from any control system which controls other aspects of the present subject matter. Various embodiments of the control system 309 contain hardware, software, or a combination of hardware and software. For example, some embodiments use a processor and a memory. Computer readable instructions are embedded in the memory, and the processor operates on these instructions to perform the control processes.

FIG. 3B illustrates a system for stacking foil electrodes using an electromagnet 321. In various embodiments, the electromagnet 321 is controlled by a control system 309 which switches electrical current to the electro magnet. In various embodiments, the control system varies the flow of electrical current to the magnet, modulating the influence of the magnetic field on the electrode stack.

In various embodiments, the control system 309 is part of the control system which controls other aspects of the present subject matter. In other embodiments, the control system 309 exists separate from any control system which controls other aspects of the present subject matter. Various embodiments of the control system 309 contain hardware, software, or a combination of hardware and software. For example, some embodiments use a processor and a memory. Computer readable instructions are embedded in the memory, and the processor operates on these instructions to perform the control processes.

Figure 4:
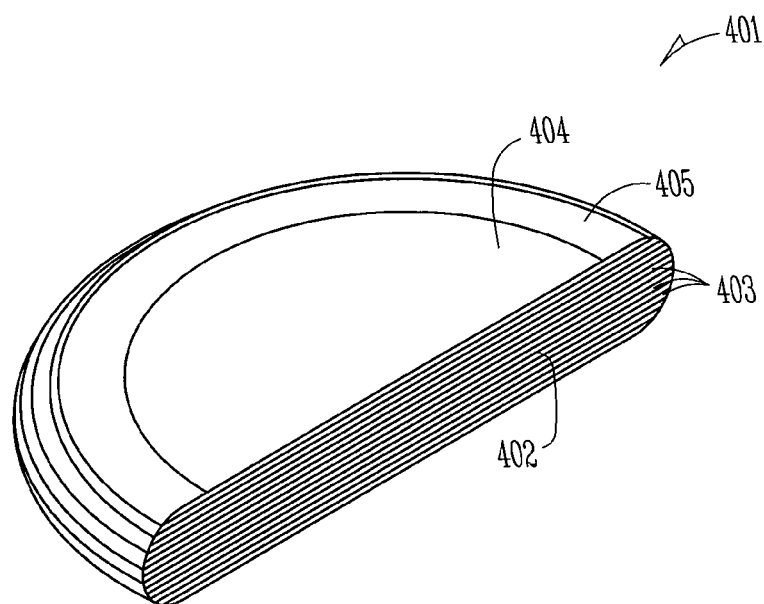
FIG. 4 illustrates an example of a flat electrode stack for an implantable medical device, according to various embodiments of the present subject matter.

FIG. 4 illustrates an example of a flat electrode stack for an implantable medical device. The curved profile of face 402 is achieved by stacking foil electrode layers 403 of varied profiles. For example, foil electrode 404 has a smaller profile than foil electrode 405. Stacking foil electrodes of varied profiles enables the creation of an electrode stack 401 which fits within a similarly shaped container. Matching the shape of the electrode stack to the shape of the container decreases the amount of unused space in the container. Less unused space is often a goal in the construction of implantable medical devices. One benefit of the present subject matter is that it can create electrode stacks of various shapes.

Capacitor Electrodes

Figure 5A:
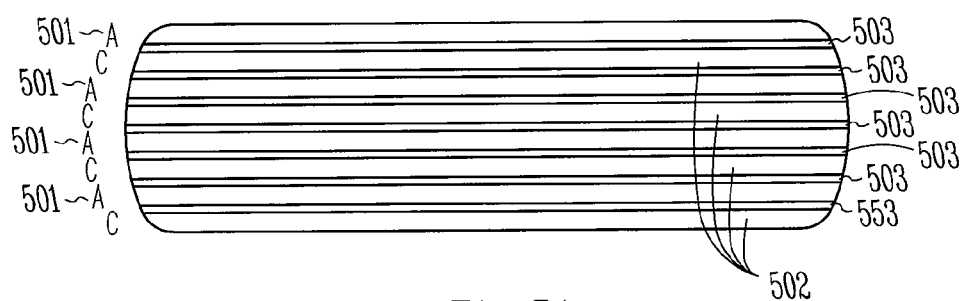
FIGS. 5A-5B illustrate examples of anode and cathode configurations for a flat capacitor for an implantable medical device.
Figure 5B:
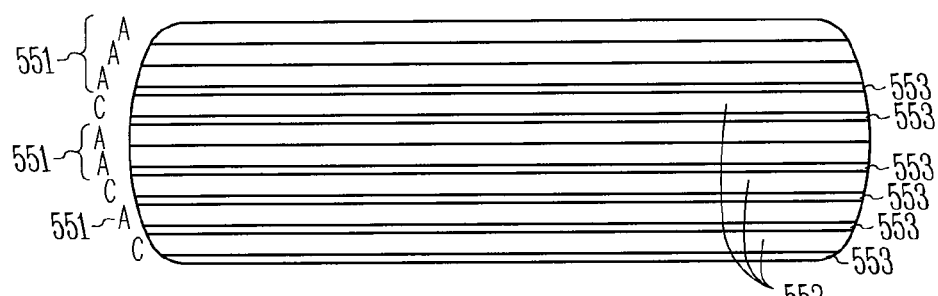

FIGS. 5A-5B illustrate examples of anode and cathode configurations for a flat capacitor for an implantable medical device. FIG. 5A illustrates an example of a capacitor configuration for an implantable medical device. In various embodiments, the capacitor configuration 500 is constructed from alternating anode 501 and cathode 502 layers, separated from one another by separator layers 503. In various embodiments, one or both of the anode and cathode layers are magnetic. According to various embodiments, the electrodes are a thin foil on the order of 0.003 inches thick. However, the present subject matter can be used with foil electrodes having other thicknesses. For example, according to various embodiments, the present subject matter is used to stack foil electrodes having a thickness ranging from approximately 0.0004 inches to approximately 0.004 inches, to stack foil electrodes having a thickness ranging from approximately 0.001 inches to approximately 0.005 inches, to stack foil electrodes having a thickness less than 0.025 inches, and to stack foil electrodes having a thickness less than 0.250 inches.

FIG. 5B illustrates an example of a capacitor configuration for an implantable medical device. In various embodiments, the capacitor configuration 550 is constructed from cathode layers 552 stacked with multiple anode layers 551. In various embodiments, several anode layers are stacked proximate to each other to form an anode sub-assembly. Each anode sub-assembly is then stacked between cathode layers 552. In various embodiments, a separator layer 553 is stacked between each cathode and each anode or anode sub-assembly, and is not stacked between two anode layers stacked proximate to each other. In various embodiments, a separator layer 553 exists between all layers.

Additionally, in various embodiments, the capacitor anode or cathode layers use foils of aluminum, tantalum, hafnium, niobium, titanium, zirconium, butrylactone, stainless steel, aluminum, carbon monofluoride, silver vanadium oxide or combinations of these materials. Nickel and stainless steel are examples of magnetic materials. In various embodiments, the separators are made from pure cellulose or low porosity paper such as Kraft paper. In various embodiments, the separators carry an electrolyte such as an ethylene-glycol base combined with butrylactone. In some embodiments, the separators are cut so that they have a slightly larger profile than the foil electrode layers, to prevent subsequent shorting between foil electrodes, as might occur when edge burrs remnant from foil electrode cutting come into contact with each other, or by other shorting modes.

The present subject matter allows electrode stacks to be manufactured quickly and easily. Moreover, it provides for greater electrode foil surface area, since the surface area is not reduced by alignment features such as notches in a capacitor case or the electrode foil itself, which decreases the surface area.

Battery Electrodes

Figure 6:
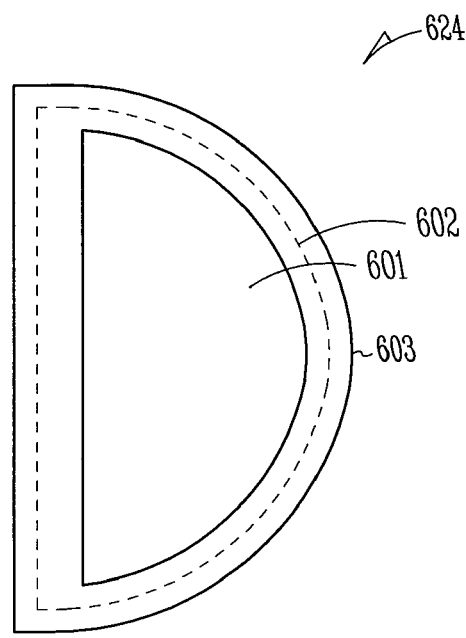
FIG. 6 illustrates a top view of an example of a battery, according to various embodiments of the present subject matter.

FIG. 6 illustrates a top view of an example of a battery. In various embodiments, the battery is composed of foil electrode layers of different sizes and/or shapes as is defined by their planar edge. According to various embodiments, the electrodes are a thin foil on the order of 0.010 inches thick. However, the present subject matter can be used with foil electrodes having other thicknesses. For example, according to various embodiments, the present subject matter is used to stack foil electrodes having a thickness ranging from approximately 0.005 inches to 0.015 inches, to stack foil electrodes having a thickness less than 0.250 inches, and to stack foil electrodes having a thickness less than 0.050 inches.

As pictured in FIG. 6, the varying shapes, when stacked, allow the assembled battery electrode stack to conform to a contoured envelope. In one embodiment, the shape of electrode stack 624 resembles the capital letter "D". A contoured electrode stack enables the assembled stack 624 to be placed in a similarly contoured container, which limits the amount of unutilized space.

A contoured stack can be difficult to assemble without the use of a pick-and-place machine, because it is difficult to register the shapes to each other and hold them in the stack using physical registration, such as a fixture shaped like the desired stack contour. By using pick-and-place assembly, in combination with a magnetic hold-down, the present subject matter quickly stacks layers of different shapes.

In various embodiments, FIG. 6 illustrates a top view of an example of a battery. In various embodiments, battery foil electrodes of varying shapes, according to their planar edge, are stacked to form a battery as illustrated. Some foil electrode cutting processes used to make anode and cathode battery layers produce edge burrs on the layers that can cause a short circuit when a burr on an anode layer edge portion makes contact with an adjacent cathode layer or vice-versa. When the dimensions of the cathode and anode layers are the same, so that the edges of each layer are aligned, burrs on overlapping edge portions of the anode and cathode layers can contact and cause a short circuit.

Accordingly, some battery stack embodiments are constructed with layers having edge portions that are offset from one another. The cathode 601 and anode 603 layers have a different profile so that portions of their edges are offset in the layered structure. The anode 603 and cathode 601 layers have the same profile shape generally, but are proportionally sized different. For example, the layers have different sized profiles so that the perimeter of one layer is circumscribed by the perimeter of the other layer. In various embodiments, the separator layers 602 circumscribe the anode 603 and cathode 601 layers, reducing the potential for the foil electrode profiles to escape the profile of the separator layer and short against one another.

Additionally, in various embodiments, the battery anode or cathode layers use foils comprised of manganese dioxide, lithium, nickel or combinations of these metals. In various embodiments, a separator material is made from a polypropylene polyethylene membrane which enables ionic mass transfer inside the battery, such as Cellguard.

The present subject matter allows electrode stacks to be manufactured quickly and easily. Moreover, it provides for greater electrode foil surface area, since the surface area is not reduced by alignment features such as notches in a capacitor case or the electrode foil itself, which decreases the surface area.

Figure 7:
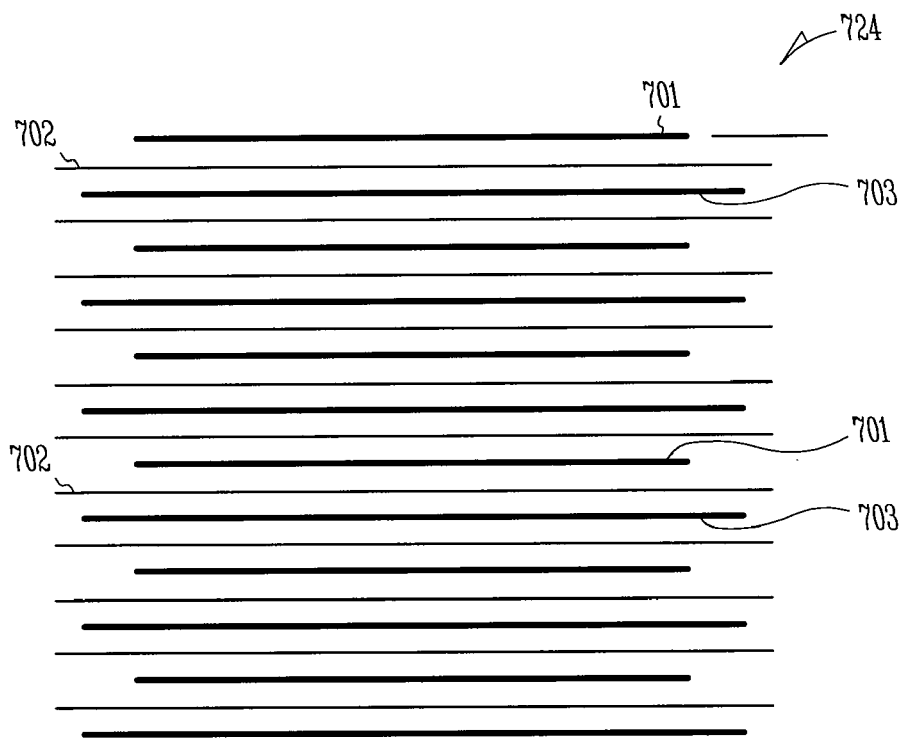
FIG. 7 illustrates a side view of an example of a battery, according to various embodiments of the present subject matter.

FIG. 7 illustrates a side view of an example of a battery 724. In various embodiments, battery foil electrodes of varying shapes, according to their planar edge, are stacked to form a battery as illustrated. Some foil electrode cutting processes used to make anode and cathode battery layers produce edge burrs on the layers that can cause a short circuit when a burr on an anode layer edge portion makes contact with an adjacent cathode layer or vice-versa. When the dimensions of the cathode and anode layers are the same, so that the edges of each layer are aligned, burrs on overlapping edge portions of the anode and cathode layers can contact and cause a short circuit.

Accordingly, some battery stack embodiments are constructed with layers having edge portions that are offset from one another. The cathode 701 and anode 703 layers have a different profile so that portions of their edges are offset in the layered structure. The anode 703 and cathode 701 layers have the same profile shape generally, but are proportionally sized different. For example, the layers have different sized profiles so that the perimeter of one layer is circumscribed by the perimeter of the other layer. In various embodiments, the separator layers 702 circumscribe the anode 703 and cathode 701 layers, reducing the potential for the foil electrode profiles to escape the profile of the separator layer and short against one another.

Figure 8:
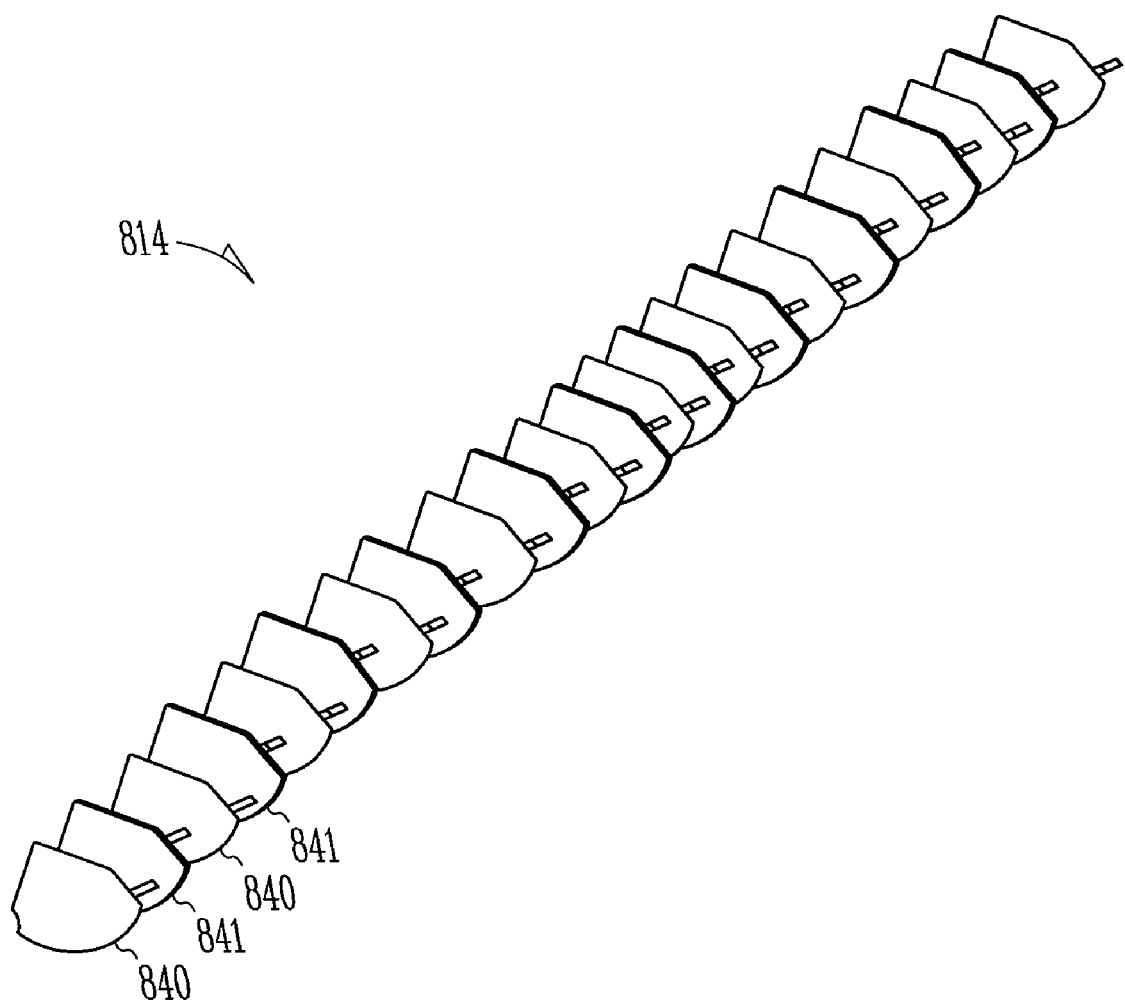
FIG. 8 illustrates an isometric expanded view of a battery, according to various embodiments of the present subject matter.

FIG. 8 illustrates an isometric expanded view of a battery 814. In various embodiments, the envelope of the battery forms a complex shape. The complex shape is formed from complex shaped cathodes 840 and anodes 841. In various embodiments, the battery 814 is constructed from 23 electrode layers. One function of the present subject matter is to reduce the difficulty in assembling such a stack, by using pick-and-place machinery and a magnetic hold-down.

Exemplary Methods

Figure 9A:
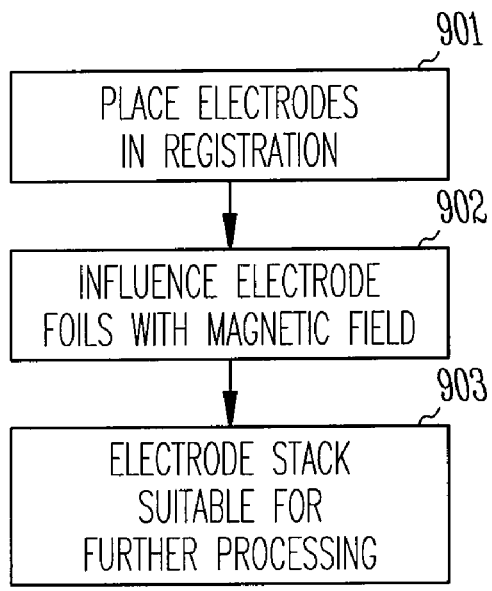
FIGS. 9A-9B illustrates a method for stacking electrodes, according to various embodiments of the present subject matter.
Figure 9B:
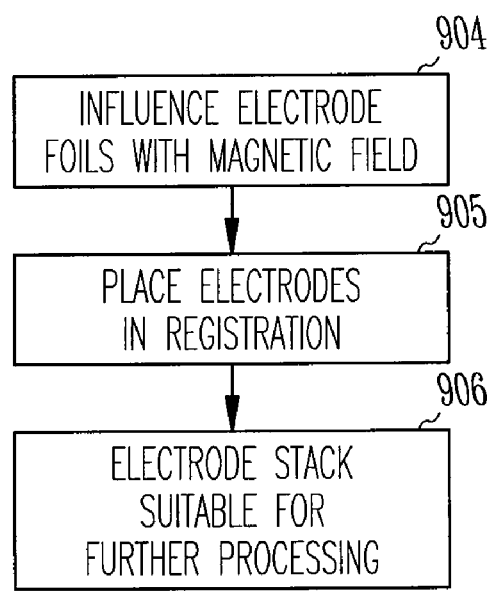

FIGS. 9A-9B illustrate methods for stacking electrodes, according to various embodiments of the present subject matter. As illustrated in FIG. 9A, the foil electrodes are placed into registration 901. A magnetic field is applied 902 to the foil electrodes to hold them down. After a suitable number of electrodes are placed into registration 905, an electrode stack is available for further processing 903. For example, the further processing includes packaging in a capacitor in various embodiments and includes packaging in a battery in various embodiments. FIG. 9B illustrates a method which influences the electrode foils 904 before they are placed into registration 905. After a suitable number of electrodes are placed into registration 905, an electrode stack is available for further processing 906. One benefit of the illustrated methods is that they hold the foil electrodes in the position in which they were placed, reducing the effects of air current or vibration on the stability of the desired electrode stack alignment.

Figure 10:
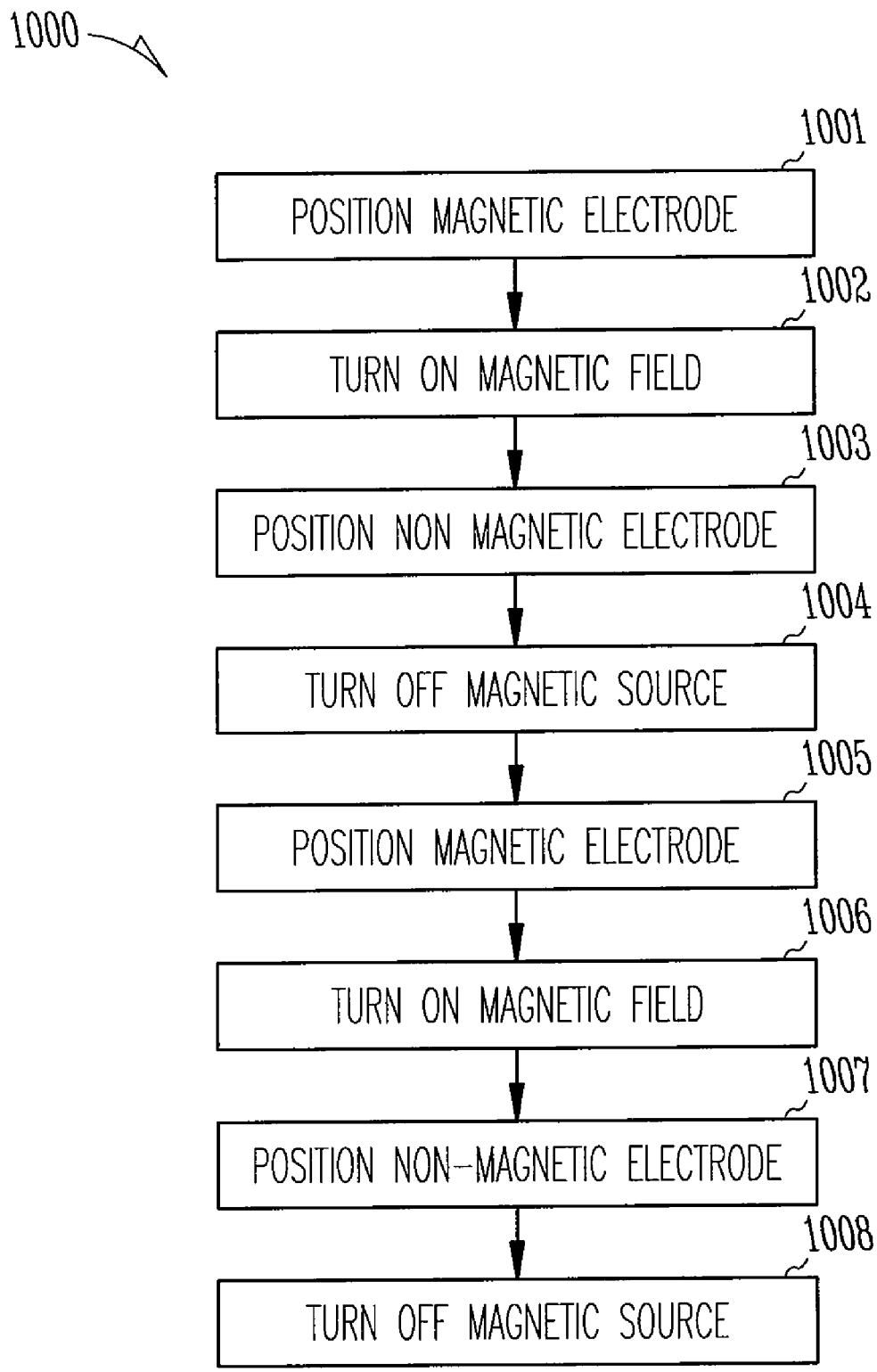
FIG. 10 illustrates a method for stacking electrodes, according to various embodiments of the present subject matter.

FIG. 10 illustrates a method 1000 for stacking foil electrodes, according to various embodiments of the present subject matter. A magnetic foil electrode is placed on the stack 1001, a magnetic potential is directed at a working surface 1002, and a nonmagnetic foil electrode is placed on the working surface 1003. In various embodiments, the magnetic source is modulated as it is applied, so as not to deform magnetic foil electrodes as they are placed. In some embodiments, the magnetic field is turned off 1004. In various embodiments, a magnetic foil electrode is placed onto the nonmagnetic foil electrode, and the magnetic field holds the foil electrodes in place by sandwiching nonmagnetic foil electrodes 1003 between magnetic foil electrodes and the working surface. The method illustrated in FIG. 10 repeats until an electrode stack is assembled.

Figure 11:
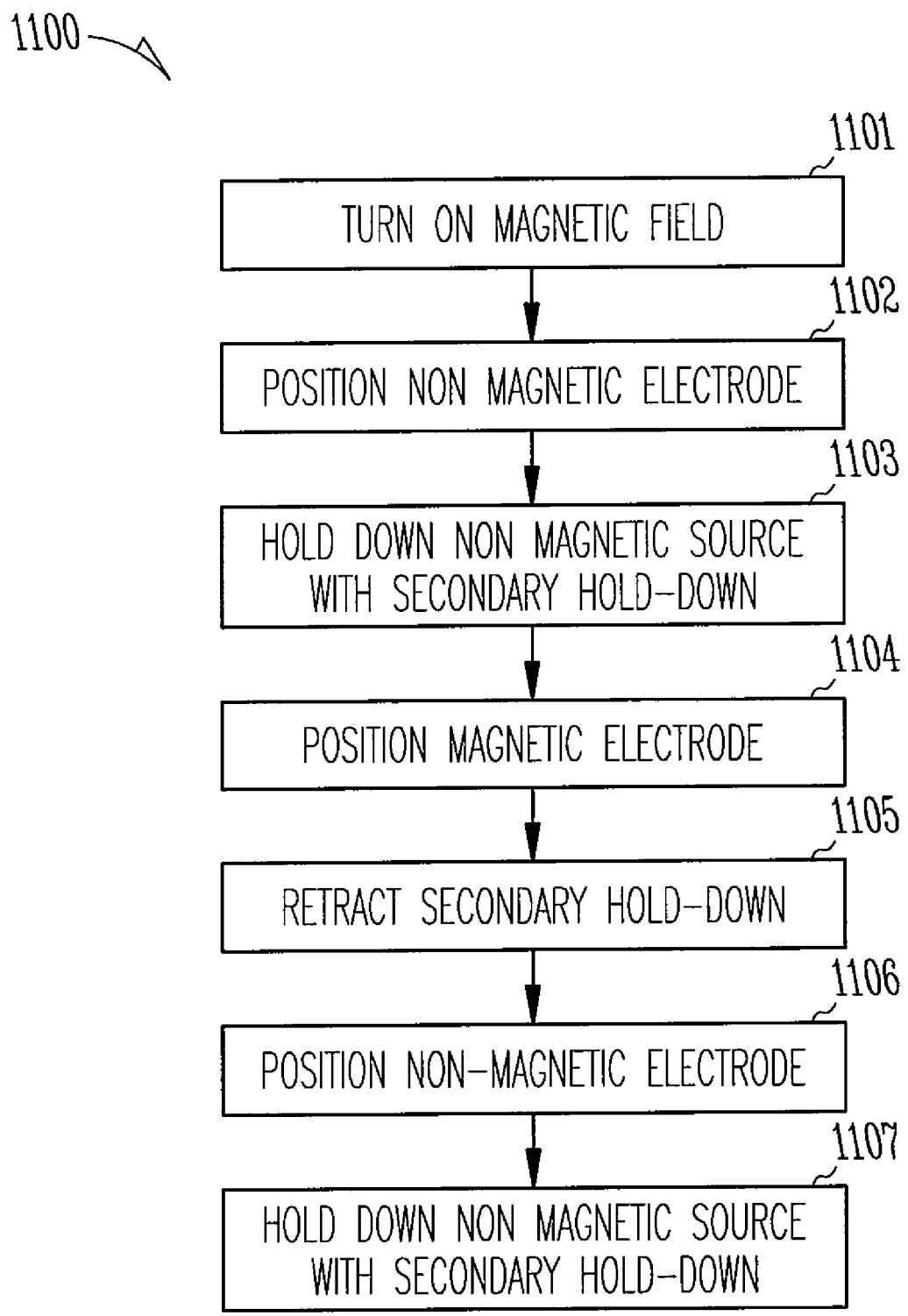
FIG. 11 illustrates a method for stacking electrodes, according to various embodiments of the present subject matter.

FIG. 11 illustrates a method 1100 for stacking foil electrodes, according to various embodiments of the present subject matter. In various embodiments, the magnetic source produces a constant magnetic potential 1101. In some embodiments, an intermittent magnetic field is applied to assist with placing and stacking the foil electrodes without causing damage to them. In various embodiments, a nonmagnetic foil electrode is placed 1102, a secondary hold-down holds the stack 1103, a magnetic foil electrode is placed 1104, and a magnetic field is applied to the magnetic foil electrode, holding the stack in place as the secondary hold-down is retracted 1105.

FIGS. 10-11 illustrate various embodiments of assembly sequences, but should not be recognized as a complete list of potential sequences. For example, these methods may be supplemented by modulating the strength of the magnetic field's influence on the foil electrodes. Such an embodiment could optimize the cycle time for the process, by increasing the effectiveness of magnetic influence while decreasing the potential damage to foil electrodes.

Thus, the embodiments described herein are suited for the production of electrode stacks. One use for such electrode stacks is in capacitors or batteries which are used in implantable medical devices. Examples of implantable medical devices include pacemakers, defibrillators, and combinations thereof. In addition to implantable defibrillators and cardioverters, the electrode stacks can be incorporated into other implantable stimulation devices, such as cardiac rhythm management systems, including, but not limited to, heart pacers, combination pacer-defibrillators, congestive heart failure devices, and drug-delivery devices for diagnosing or treating cardiac arrhythmias. Moreover, the electrode stacks can also be incorporated into non-medical applications such as photographic flash equipment.

One of ordinary skill in the art will understand that, the control systems shown and described herein can be implemented using software, hardware, and combinations of software and hardware. As such, the term "system" is intended to encompass software implementations, hardware implementations, and software and hardware implementations.

In various embodiments, the methods provided above are implemented as a computer data signal embodied in a carrier wave or propagated signal, that represents a sequence of instructions which, when executed by a processor, cause the processor to perform the respective method. In various embodiments, methods provided above are implemented as a set of instructions contained on a computer-accessible medium capable of directing a processor to perform the respective method. In various embodiments, the medium is a magnetic medium, an electronic medium, or an optical medium.

Although specific embodiments have been illustrated and described herein, it will be appreciated by those of ordinary skill in the art that any arrangement which is calculated to achieve the same purpose may be substituted for the specific embodiment shown. This application is intended to cover adaptations or variations of the present subject matter. It is to be understood that the above description is intended to be illustrative, and not restrictive. Combinations of the above embodiments, and other embodiments will be apparent to those of skill in the art upon reviewing the above description. The scope of the present subject matter should be determined with reference to the appended claims, along with the full scope of equivalents to which such claims are entitled.

What is claimed is:

1. A process for stacking foil electrodes into an assembly, comprising:
    forming an electrode stack proximate to a working surface during an assembly process, the electrode stack including two or more foil electrodes, at least one of the foil electrodes being a magnetic foil electrode;
    transmitting a signal with a control system to control a magnetic source to intermittently provide a magnetic field in response to the signal, the magnetic source to intermittently influence the at least one magnetic foil electrode and hold one or more foil electrodes to the working surface during the assembly process; and
    modulating the magnetic field during forming the electrode stack to apply a magnetic field having a first strength after the magnetic foil electrode is placed, and having a second strength while the magnetic foil electrode is being placed.

2. The process of claim 1, wherein providing a magnetic field includes providing a permanent magnet.

3. The process of claim 1, wherein providing a magnetic field includes actuating an electromagnet.

4. The process of claim 1, further comprising applying a mechanical hold-down to temporarily hold a nonmagnetic foil electrode during the assembly process.

5. The process of claim 1, wherein providing a magnetic field includes selectively applying the magnetic field during the assembly process.

6. The process of claim 1, further comprising holding the electrode stack to the working surface with a nonmagnetic arm.

7. The process of claim 1, further comprising conveying the electrode stack away from the magnetic source after the electrode stack is assembled.

8. The process of claim 1, wherein the magnetic source, the working surface and the electrode stack maintain alignment with one another while the electrode stack is being formed.

9. The process of claim 8, wherein the magnetic field influences the at least one magnetic foil only after the at least one magnetic foil is placed in a position to form the electrode stack.

10. The process of claim 1, further comprising:
   stacking at least a first nonmagnetic foil electrode into a partial stack;
   holding the partial stack by pinching the partial stack to the working surface with a nonmagnetic hold-down;
   stacking a first magnetic foil electrode onto the partial stack; and
   holding the partial stack to the working surface by influencing the first magnetic foil with the magnetic field.

11. The process of claim 10, further comprising removing the nonmagnetic hold-down while influencing the partial stack with the magnetic field.

12. The process of claim 11, further comprising deactivating the magnetic field and placing a second magnetic foil onto the partial stack.

13. The process of claim 12, further comprising reactivating the magnetic field after the second magnetic foil is completely placed onto the partial stack.

14. A process for stacking foil electrodes into an assembly, comprising:
   forming an electrode stack proximate to a working surface during an assembly process, the electrode stack including two or more foil electrodes, at least one of the foil electrodes being a magnetic foil electrode; and
   providing a magnetic field to influence the at least one magnetic foil electrode and hold one or more foil electrodes to the working surface during the assembly process,
   wherein the process further comprises:
   stacking at least a first nonmagnetic foil electrode into a partial stack;
   holding the partial stack by pinching the partial stack to the working surface with a nonmagnetic hold-down;
   stacking a first magnetic foil electrode onto the partial stack; and
   holding the partial stack to the working surface by influencing the first magnetic foil with the magnetic field.

15. The process of claim 14, further comprising removing the nonmagnetic hold-down while influencing the partial stack with the magnetic field.

16. The process of claim 15, further comprising deactivating the magnetic field and placing a second magnetic foil onto the partial stack.

17. The process of claim 16, further comprising reactivating the magnetic field after the second magnetic foil is completely placed onto the partial stack.

18. The process of claim 14, wherein the magnetic source, the working surface and the electrode stack maintain alignment with one another while the electrode stack is being formed.

19. The process of claim 18, wherein the magnetic field influences the at least one magnetic foil only after the at least one magnetic foil is placed in a position to form the electrode stack.

20. The process of claim 14, wherein providing a magnetic field includes providing a permanent magnet.

21. The process of claim 14, wherein providing a magnetic field includes actuating an electromagnet.

22. The process of claim 14, further comprising applying a mechanical hold-down to temporarily hold a nonmagnetic foil electrode during the assembly process.

23. The process of claim 14, wherein providing a magnetic field includes selectively applying the magnetic field during the assembly process.

24. The process of claim 14, further comprising holding the electrode stack to the working surface with a nonmagnetic arm.

25. The process of claim 14, further comprising conveying the electrode stack away from the magnetic source after the electrode stack is assembled.

26. The process of claim 14, further comprising modulating the magnetic field during forming the electrode stack to apply a magnetic field having a first strength after the magnetic foil electrode is placed, and having a second strength while the magnetic foil electrode is being placed.

27. A process for stacking foil electrodes into an assembly, comprising:
   forming an electrode stack proximate to a working surface during an assembly process, the electrode stack including two or more foil electrodes, at least one of the foil electrodes being a magnetic foil electrode;
   intermittently providing a magnetic field to intermittently influence the at least one magnetic foil electrode and hold one or more foil electrodes to the working surface during the assembly process; and
   modulating the magnetic field during forming the electrode stack to apply a magnetic field having a first strength after the magnetic foil electrode is placed, and having a second strength while the magnetic foil electrode is being placed.

28. The process of claim 27, wherein the magnetic source, the working surface and the electrode stack maintain alignment with one another while the electrode stack is being formed.

29. The process of claim 28, wherein the magnetic field influences the at least one magnetic foil only after the at least one magnetic foil is placed in a position to form the electrode stack.

30. The process of claim 27, further comprising:
   stacking at least a first nonmagnetic foil electrode into a partial stack;
   holding the partial stack by pinching the partial stack to the working surface with a nonmagnetic hold-down;
   stacking a first magnetic foil electrode onto the partial stack; and
   holding the partial stack to the working surface by influencing the first magnetic foil with the magnetic field.

31. The process of claim 30, further comprising removing the nonmagnetic hold-down while influencing the partial stack with the magnetic field.

32. The process of claim 31, further comprising deactivating the magnetic field and placing a second magnetic foil onto the partial stack.

33. The process of claim 32, further comprising reactivating the magnetic field after the second magnetic foil is completely placed onto the partial stack.

34. The process of claim 27, wherein providing a magnetic field includes providing a permanent magnet.

35. The process of claim 27, wherein providing a magnetic field includes actuating an electromagnet.

36. The process of claim 27, further comprising applying a mechanical hold-down to temporarily hold a nonmagnetic foil electrode during the assembly process.

37. The process of claim 27, wherein providing a magnetic field includes selectively applying the magnetic field during the assembly process.

38. The process of claim 27, further comprising holding the electrode stack to the working surface with a nonmagnetic arm.

39. The process of claim 27, further comprising conveying the electrode stack away from the magnetic source after the electrode stack is assembled.

40. A process for stacking foil electrodes into an assembly, comprising:
    forming an electrode stack proximate to a working surface during an assembly process, the electrode stack including two or more foil electrodes, at least one of the foil electrodes being a magnetic foil electrode; and
    intermittently providing a magnetic field to intermittently influence the at least one magnetic foil electrode and hold one or more foil electrodes to the working surface during the assembly process, wherein the magnetic field influences the at least one magnetic foil only after the at least one magnetic foil is placed in a position to form the electrode stack.

41. The process of claim 40, further comprising:
    stacking at least a first nonmagnetic foil electrode into a partial stack;
    holding the partial stack by pinching the partial stack to the working surface with a nonmagnetic hold-down;
    stacking a first magnetic foil electrode onto the partial stack; and
    holding the partial stack to the working surface by influencing the first magnetic foil with the magnetic field.

42. The process of claim 41, further comprising removing the nonmagnetic hold-down while influencing the partial stack with the magnetic field.

43. The process of claim 42, further comprising deactivating the magnetic field and placing a second magnetic foil onto the partial stack.

44. The process of claim 43, further comprising reactivating the magnetic field after the second magnetic foil is completely placed onto the partial stack.

45. The process of claim 40, further comprising modulating the magnetic field during forming the electrode stack to apply a magnetic field having a first strength after the magnetic foil electrode is placed, and having a second strength while the magnetic foil electrode is being placed.

46. The process of claim 40, wherein the magnetic source, the working surface and the electrode stack maintain alignment with one another while the electrode stack is being formed.

47. The process of claim 46, wherein the magnetic field influences the at least one magnetic foil only after the at least one magnetic foil is placed in a position to form the electrode stack.

48. The process of claim 40, wherein providing a magnetic field includes providing a permanent magnet.

49. The process of claim 40, wherein providing a magnetic field includes actuating an electromagnet.

50. The process of claim 40, further comprising applying a mechanical hold-down to temporarily hold a nonmagnetic foil electrode during the assembly process.

51. The process of claim 40, wherein providing a magnetic field includes selectively applying the magnetic field during the assembly process.

52. The process of claim 40, further comprising holding the electrode stack to the working surface with a nonmagnetic arm.

53. The process of claim 40, further comprising conveying the electrode stack away from the magnetic source after the electrode stack is assembled.

54. A process for stacking foil electrodes into an assembly, comprising:
    forming an electrode stack proximate to a working surface during an assembly process, the electrode stack including two or more foil electrodes, at least one of the foil electrodes being a magnetic foil electrode; and
    transmitting a signal with a control system to control a magnetic source to intermittently provide a magnetic field in response to the signal, the magnetic source to intermittently influence the at least one magnetic foil electrode and hold one or more foil electrodes to the working surface during the assembly process,
    wherein the magnetic source, the working surface and the electrode stack maintain alignment with one another while the electrode stack is being formed, and
    wherein the magnetic field influences the at least one magnetic foil only after the at least one magnetic foil is placed in a position to form the electrode stack.

55. The process of claim 54, further comprising:
    stacking at least a first nonmagnetic foil electrode into a partial stack;
    holding the partial stack by pinching the partial stack to the working surface with a nonmagnetic hold-down;
    stacking a first magnetic foil electrode onto the partial stack; and
    holding the partial stack to the working surface by influencing the first magnetic foil with the magnetic field.

56. The process of claim 55, further comprising removing the nonmagnetic hold-down while influencing the partial stack with the magnetic field.

57. The process of claim 56, further comprising deactivating the magnetic field and placing a second magnetic foil onto the partial stack.

58. The process of claim 57, further comprising reactivating the magnetic field after the second magnetic foil is completely placed onto the partial stack.

59. The process of claim 54, wherein providing a magnetic field includes providing a permanent magnet.

60. The process of claim 54, wherein providing a magnetic field includes actuating an electromagnet.

61. The process of claim 54, further comprising applying a mechanical holddown to temporarily hold a nonmagnetic foil electrode during the assembly process.

62. The process of claim 54, wherein providing a magnetic field includes selectively applying the magnetic field during the assembly process.

63. The process of claim 54, further comprising holding the electrode stack to the working surface with a nonmagnetic arm.

64. The process of claim 54, further comprising conveying the electrode stack away from the magnetic source after the electrode stack is assembled.

65. The process of claim 54, further comprising modulating the magnetic field during forming the electrode stack to apply a magnetic field having a first strength after the magnetic foil electrode is placed, and having a second strength while the magnetic foil electrode is being placed.

* * * * *

UNITED STATES PATENT AND TRADEMARK OFFICE
CERTIFICATE OF CORRECTION

PATENT NO. : 7,611,549 B2  Page 1 of 1
APPLICATION NO. : 10/744942
DATED : November 3, 2009
INVENTOR(S) : Benjamin J. Haasl It is certified that error appears in the above-identified patent and that said Letters Patent is hereby corrected as shown below:

In column 14, line 49, in Claim 61, delete "holddown" and insert -- hold-down --, therefor.

Signed and Sealed this

Nineteenth Day of January, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,611,549 B2 | Page 1 of 1 |
| APPLICATION NO. | : 10/744942 | |
| DATED | : November 3, 2009 | |
| INVENTOR(S) | : Benjamin J. Haasl | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1634 days.

Signed and Sealed this

Twelfth Day of October, 2010

David J. Kappos
*Director of the United States Patent and Trademark Office*